United States Patent
Zirkia (12)

(10) Patent No.: US 8,568,820 B2
(45) Date of Patent: Oct. 29, 2013

(54) METHOD OF TREATING CARBOHYDRATE RICH FOODS FOR REDUCING THEIR GLYCEMIC INDICIES

(76) Inventor: Bashir A Zirkia, Norwood, NJ (US)

( * ) Notice: Subject to any disclaimer, the term of this patent is extended or adjusted under 35 U.S.C. 154(b) by 0 days.

(21) Appl. No.: 13/330,841

(22) Filed: Dec. 20, 2011

(65) Prior Publication Data

US 2013/0158133 A1    Jun. 20, 2013

(51) Int. Cl.
*A23L 3/015*   (2006.01)
*A23L 1/216*   (2006.01)
*A23B 4/06*    (2006.01)
*C08B 30/12*   (2006.01)
*C08B 30/00*   (2006.01)

(52) U.S. Cl.
USPC .............. 426/665; 426/506; 426/637; 127/32; 127/65; 127/71

(58) Field of Classification Search
USPC .................. 424/400; 426/402, 665, 506, 637; 127/32, 65, 71
See application file for complete search history.

(56) References Cited

U.S. PATENT DOCUMENTS

| 5,593,503 | A  | * | 1/1997  | Shi et al. ........................... 127/71 |
| 5,690,954 | A  | * | 11/1997 | Illum ............................. 424/434 |
| 7,687,248 | B2 | * | 3/2010  | King et al. ....................... 435/98 |
| 2006/0257977 | A1 | * | 11/2006 | Hamaker et al. ................. 435/96 |
| 2009/0084730 | A1 | * | 4/2009  | Mabille et al. ................. 210/682 |
| 2012/0201948 | A1 | * | 8/2012  | Huber ........................... 426/637 |

OTHER PUBLICATIONS

Bahado-Singh et al. "Relationship between processing method and the glycemic indices of ten sweet potato (*Ipomoea batabas*) cultivars commonly consumed in Jamaica," Journal of Nutrition and Metabolism vol. 2011. pp. 1-6.*

* cited by examiner

*Primary Examiner* — Maria Leavitt
*Assistant Examiner* — Kyung Sook Chang
(74) *Attorney, Agent, or Firm* — Evelyn M. Sommer

(57) ABSTRACT

The production of starch containing products such as rice for use in a low glycemic diet as a carbohydrate substitute in diet preparations is disclosed. The preparation may be readily adjusted in form and taste with respect to aroma, texture, consistency, and flavor for utilization in a number of food preparation techniques including baking and frying. The method provides digestible starches from native and commercial starches by controlled heating and/or enzymatic processing and filtration of carbohydrates.

20 Claims, No Drawings

METHOD OF TREATING CARBOHYDRATE RICH FOODS FOR REDUCING THEIR GLYCEMIC INDICIES

FIELD OF THE INVENTION

The present invention relates to a method of treating starch-containing products for reducing their glycemic indices.

BACKGROUND OF THE INVENTION

Obesity has become a pandemic disease as well as the increased incidences of diabetes mellitus, hypertension, congestive heart failure and other less life-threatening complications over the last 2-3 decades. The cost of obesity and morbid obesity and the attempts to reduce weight in obese individuals in the United States alone are in excess of $150 billion. The increased incidence of obesity runs parallel to the increase in incidence of diabetes, cardiovascular diseases and hypertension.

However, neither the innumerable weight loss diets, medications, nor even the radical approaches of surgery have produced long-term, effective results. Whatever good results have been achieved has been costly financially and healthwise. Many specialists attribute these trends to the culture of self-gratification, increasing psychological stress, food industries' successful advertisements of "processed foods," fast-food venues for high caloric and high carbohydrate foods such as French fries, cookies, cakes, chocolates, and many other popular foods. In spite of the recognition of the problem in the last two decades, governmental educational attempts, news media and school campaigns have achieved little in solving the obesity problem.

In 1934, Walter Kempner made the observation that people using rice as a staple food "rarely had diseases such as hypertension and diabetes." He established the world-famous Rice Diet Center and the "Rice Diet Program" in Durham, N.C., and specialized in the prevention, treatment and reversal of "obesity, heart disease, hypertension, diabetes, congestive heart failure and kidney disease." However, successful results of loss of 100 pounds in six-month stays at "Rice House" were, unfortunately, reversed after patients returned to their homes and to their old eating habits. Attempts to bring about changes in eating behavior at so-called fat farms by use of psychotherapy, use of personal dietitians, etc., also have not been successful in achieving significant improvement in long-term results.

A recent popular diet is the low carbohydrate diet of Dr. Pierre Dukan of France. It has gained greater popularity among dieters than other commercial low-carbohydrate diets such as South Beach Diet, Zone Diet, Atkins diets, etc. However, since carbohydrates constitute the largest percentage of the public's diet (greater than 40%), any weight loss diet is very difficult to maintain for a long period as required to achieve good, long-term results in the processed-food culture most persons are exposed to.

Behavior modification, business-cultural changes, medical treatments and the offering myriads of restricted diets have not proved successful. It has been proposed to change so-called harmful processed foods into beneficial ones.

In 1980-1981, at the University of Toronto, Dr. David J. Jenkins developed the concept of the glycemic index ("GI") while working with diabetic patients. Dr. Jenkins discovered that the best foods for diabetic patients were those with the lowest GI. The glycemic index is a measure of the effects of carbohydrates on blood sugar levels. Carbohydrates that break down quickly during digestion and release glucose rapidly into the bloodstream have a high GI. This concept is attributed to Dr. David J. Jenkins and his colleagues (D J Jenkins et al (1981) Am. J. Clin. Nutr. 34; 362-266) in their research to find out which foods were best for people with diabetes. A lower glycemic index suggests slower rates of digestion and absorption of the foods' carbohydrates and may also indicate greater extraction from the liver and periphery of the products of carbohydrate digestion. A lower glycemic response usually equates to a lower insulin demand but not always, and may improve long-term blood glucose control and blood lipids.

The glycemic index of a food is defined as the area under the two hour blood glucose response curve (AUC) following the ingestion of a fixed portion of carbohydrate (usually 50 g). The AUC of the test food is divided by the AUC of the standard (either glucose or white bread, giving two different definitions) and multiplied by 100. The average GI value is calculated from data collected in 10 human subjects. Both the standard and test food must contain an equal amount of available carbohydrate. The result gives a relative ranking for each tested food.

The current validated methods use glucose as the reference food, giving it a glycemic index value of 100 by definition. This has the advantages of being universal and producing maximum GI values of approximately 100. White bread can also be used as a reference food, giving a different set of GI values (if white bread=100, then glucose≈140). For people whose staple carbohydrate source is white bread, this has the advantage of conveying directly whether replacement of the dietary staple with a different food would result in faster or slower blood glucose response. The disadvantages with this system are that the reference food is not well-defined and the GI scale is culture-dependent.

GI values are commonly interpreted as follows:

| | | |
|---|---|---|
| Low GI | 55 or less | most fruits and vegetables, legumes/pulses, whole grains, nuts, fructose and products low in carbohydrates |
| Medium GI | 56-69 | whole wheat products, basmati rice, sweet potato, sucrose, baked potatoes |
| High GI | 70 and above | white bread, most white rices, corn flakes, extruded breakfast cereals, glucose, maltose |

A low-GI food will release glucose more slowly and steadily, which leads to more suitable after-meal blood glucose readings. A high-GI food causes a more rapid rise in blood glucose levels and is suitable for energy recovery after exercise or for a person experiencing hypoglycemia.

The glycemic index can be applied only to foods with a reasonable carbohydrate content, as the test relies on subjects consuming enough of the test food to yield about 50 g of available carbohydrate. Many fruits and vegetables (but not potatoes) contain very little carbohydrate per serving, and the average person is not likely to eat 50 g of carbohydrate from these foods. Fruits and vegetables tend to have a low glycemic index and a low glycemic load. Alcoholic beverages have been reported to have low GI values, but it should be noted that beer has a moderate GI.

Many modern diets rely on the glycemic index, including the South Beach Diet, Transitions by Market America and NutriSystem Nourish Diet. However, others have pointed out that foods generally considered to be unhealthy can have a low glycemic index, for instance, chocolate cake (GI 38), ice cream (37), or pure fructose (19), whereas foods like potatoes and rice, eaten in countries with low rates of diabetes, have GIs around 100.

Several lines of recent scientific evidence have shown that individuals who followed a low-GI diet over many years were at a significantly lower risk for developing both type 2 diabetes and coronary heart disease than others. High blood glucose levels or repeated glycemic "spikes" following a meal may promote these diseases by increasing oxidative stress to the vasculature and also by the direct increase in insulin levels.

In the past, postprandial hyperglycemia has been considered a risk factor associated mainly with diabetes. However, more recent evidence shows that it also presents an increased risk for atherosclerosis in the non-diabetic population and that high GI diets and high blood-sugar levels more generally and are related to kidney disease as well.

Recent animal research provides compelling evidence that high-GI carbohydrate is associated with increased risk of obesity. In human trials, it is often difficult to separate the effects from GI and other potentially confounding factors such as fiber content, palatability, and compliance.

If a person consumes 50% of his or her calories from carbohydrates, the glycemic index can enable him or her to consume the same number of calories and have lower, more stable glucose and insulin levels.

It would be very important to be able to lower the glycemic indices of foods for health purposes to provide healthier foods than those presently available.

The process technique of the invention reduces significantly the natural glycemic indices of foods by treatment of the food to reduce its glycemic index. It therefore occurred to the inventor that his could be accomplished by treatment of the food to remove the water-soluble starch.

SUMMARY OF THE INVENTION

The production of a processed starch for use in a low glycemic index diet and namely as a carbohydrate substitute in the diet or in diet preparations is carried out by mixing the food with water, raising the temperature of the mixture to from about 50° to about 65° C., maintaining the mixture at this temperature for about 5 to about 10 minutes, and then filtering to remove the water containing soluble starch. Further quantities of the remaining water-soluble starch can be removed by addition of further water to the starch, bringing the water temperature of the resultant mixture to about 50° to about 65° C. and maintaining the mixture at this temperature for about 5 to 10 minutes, followed by filtration. This treatment step can be repeated up to three (3) more times without spoiling the starch containing food, which can be eaten at that time or can be dried and used later. As can be appreciated, the first treatment step removes the major portion of the soluble starch. At each subsequent warming in fresh water brought to from about 50° to 65° C., a portion of the water-soluble starch present in the food is remove by filtering. Experiments conducted by the inventor have indicated that at each subsequent mixing and heating, the water soluble starch content is reduced by 5 to 10%, up to a fifth filtration step. In all of the steps, the starch to water ratio was maintained at from 1:3 to 1:6, i.e., 200 grams starch to 600 grams of water to 200 grams of starch to 1,200 grams of water. The starch product retains its shape and appearance as well as its taste. The resulting starch preparations may be readily adjusted in form and taste with respect to aroma, texture, consistency and flavor.

The high caloric value, soluble starches removed from the food product may be used in different concentrations and gel formation with flavor, aroma, and texturizing additives in manufacturing high glycemic index foods, as thickening agents, alone or after addition of a pharmaceutical, cosmetic, moisturizer, colorant, enzyme, preservative, etc., as a drug, cosmetic, blood volume expanders and the like.

The unqualified term "starch" is used herein to refer to starch that is generally suitable for use in the methods of this invention to make slowly digestible starch. Starch includes all starches as they are extracted from any and all plant sources. Native starches include all starches as found in nature in any plant source. Starches can also be obtained from plants which are obtained by standard plant breeding methods, as well as by mutagenesis and genetic engineering, or by combination of mutagenesis and genetic engineering with standard plant breeding methods. Plant sources for starches include cereals, legumes, tubers, roots and fruits. Starch can be extracted from corn (maize), rice, barley, wheat, oat sorghum, oat, pea, sago, tapioca (cassava), arrowroot, sweet potato, yarns, and banana, for example. Starches can be extracted from various mutant plants which exhibit alterations in starch phenotype.

Starch also includes commercial starches that may be washed, bleached or otherwise treated to remove undesired components. Native starch from different types of plants generally may contain different percentages of amylose and amylopectin, different size starch granules and different polymeric weights for amylose and amylopectin. As a result, native starch from different plant sources may have significantly different properties. Typically, the, amylose content of starches ranges from about 15% to about 35%. Waxy starches contain higher levels of amylopectin (90% by weight or more) and are extracted from plants such as waxy maize, waxy rice, waxy barley and waxy sorghum. High amylose starches contain greater than about 50% by weight amylose. High amylose starch can be subdivided into starches containing between about 50 to 60%, 70 to 80% by weight amylose and very high amylose starches which have 95% or more by weight amylose. In general, all such native and non-native starches, and mixtures thereof, are useful as starting materials in the methods herein. However, it is generally preferred that the starch starting material contain 40% or more by weight of amylopectin. Waxy starches are a particularly interesting starting material for the methods of this invention.

The starch products produced in accordance with the invention have low glycemic indices which can be determined by methods well known in the art. (The glycemic index: methodology and clinical implications, *American Journal of Clinical Nutrition* 54:846-854).

The low glycemic index starches of this invention can be employed as ingredients in food and beverage products, in edible solid and liquid products, in liquid and solid nutritional supplements and in edible liquid or solid drug preparations. The amount of low glycemic index starch that is added to a food, nutritional or drug product is selected to achieve desired functional properties (rheological, organoleptic, or like properties) digestibility rates and energy or glucose release rates or a desirable balance of those properties. Food products or nutritional or therapeutic preparations of this invention generally can comprise between about 0.01% to about 100% by weight of a low glycemic index starch. More typically edible products comprise between about 1% to about 50% by weight of the starch.

The low glycemic index starches of this invention can replace all, or only a portion of normal, untreated starch in an edible product. The starches of this invention can, for example, replace 50% or less of normal, untreated starch in an edible product.

The low glycemic index starches of this invention can be employed as an ingredient in baked goods (cakes, cookies, pastries and the like), pasta, snack bars, cereals (ready-to-eat or cereals intended to be cooked), confectionary, dressings, fillings, icing, sauces, syrups, gravies, puddings, custards, processed dairy compositions (e.g., processed cheese, yogurts and creams), soups, beverages, sports drinks, and sustained energy release foods and snacks, such as energy bars.

The low glycemic index starches of this invention can be used to prepare edible products exhibiting lower glycemic index than similar products prepared with untreated starches.

The starches of this invention can retain at least some of the functional properties, e.g., rheological properties, exhibited by starches having average to high glycemic indices (e.g., native starches). For example, the starches of this invention can be employed to form stable pastes (e.g., stable for 12 or more hours). Thus, low glycemic index starches can be employed as functional food grade additives which provide beneficial rheological properties (viscosity, mouth feel, texture, consistency (organoleptic properties) emulsion or suspension stability, water-absorption or binding capacity or flow properties to a food or other edible product. More specifically, low glycemic index starches can be employed as food grade thickening agents and texturizing or texture-modifying agents.

The food products, both solid and liquid, containing the low glycemic index starch would be useful for weight management, the treatment of obesity and for health maintenance and treatment of diabetic and pre-diabetic individuals and may also provide benefits for individuals exhibiting glucose intolerance and hyperglycemia.

In order that the invention may be more readily understood, reference is made to the following example that is intended to illustrate the invention, but not limit the scope thereof:

EXAMPLE

In an initial step, 200 grams of water and 100 grams of white rice were heated to a temperature of 50° to 65° C. and maintained at this temperature for 5 minutes. The water-rice mixture was then subjected to a first filtration. The liquid filtrate was retained for separate processing and the solids (rice) subjected to four subsequent steps of mixing with the water in a ratio of water to starch of 2:1, heating to a temperature of 50° to 65° C., maintained at this temperature for 5 minutes, followed by filtration. Each heating and filtering step reduced the water-soluble starch content by 5-10%. The treatment steps were carried out for a sixth time whereupon the rice grains began to lose their shape and became lumpy so that there would be no benefit to be realized after a fifth treatment step. The white rice remaining after the fifth treatment step was dried and compared to brown rice treated in the same manner as set out above in connection with the white rice.

The following results were obtained:

(1) White rice has 30% more soluble starch (simple carbohydrates) than brown rice following the processing.
(2) The weight/volume of the white rice increased by 300 to 350%.
(3) The white rice maintains its shape through the $5^{th}$ filtration step.
(4) The loss of soluble starches is greatest in the first 50° to 65° C. five-minute treatment than in the other four stages of maintaining at a temperature of 50° to 65° C. for five minutes. After each heating and filtration, there was a decreased yield of soluble starch. At the fifth filtration, there was still observed a greater than 5% reduction of soluble starch.
(5) The white rice's (long grain) GI is 50 to 64. Its soluble starch constituted 30% of its original weight. Since the soluble starch is short chain starch and should have a very high GI, it is reasonable that such processed white rice, when used as a food, will have a much lower GI than 50 to 64, the GI having been reduced by as much as 20 to 30%. Such processed long grain, white rice's GI, although significantly reduced, would still be subject to further amylase, acid and other enzymatic digestion in the gastrointestinal tract, raising its GI by an estimated 5 to 10%. The treatment of long grain, white rice in accordance with the invention may reduce its GI value at least 15 to 20%, which is significant. In addition, such reduction of GI, having increased its weight and bulk by 150 to 300%, will have the additional advantage of greater filling effect (satiation).
(6) In contrast to white rice, the brown rice lost only 6% of its soluble starch or total weight compared to 30% in the case of the white rice.
(7) The brown rice's GI is 66 to 87. It possessed significantly less simple carbohydrates and soluble starch which could be converted to sugar, therefore maintaining its GI range. It is surprising that the brown rice's GI is significantly higher than the long grain white rice with its low yield of soluble starch after the processing. The reason for this may be that brown rice skeletal (cellulose-xylose) structure is such that by heating and maintenance at the temperature of heating, it does not release its low chain starch which is more prone to undergo enzymatic digestion in the gastrointestinal tract giving it a much higher GI value than long grain, white rice. However, it's increase in weight and expansion (volume) is only 50 to 150%, which reduces any advantages it has over the white rice in having a low yield of soluble starch.
(8) The brown rice retained its original oval shape and its complex and simple starches better than the white rice after processing.
(9) Since the white and brown rices had an increase in volume of 1 to 4 times, they are both considered to be fair to excellent fillers for satiety in dieting for weight loss purposes.

Other conventional foods, in addition to rice, breads, cereals, vegetables and fruit after suitable processing (grinding, milling, enzymatic treatment, etc.) can be processed in accordance with the invention and in the form recovered or after addition of suitable additives (flavorings, aroma, texture, bulk [cellulose] and coloring agents) can be used as foods or components of foods. The high caloric value starches removed in the processing can also be used in different concentrations, gel formation, addition of additives as high glycemic index foods, thickening agents, gelling agents and the like.

The invention now being fully described, it will be apparent to one of ordinary skill in the art that many changes and modifications can be made thereto without departing from the spirit or scope of the invention as set forth herein.

The invention claimed is:

1. A method for making a food product for use in a low glycemic index diet consisting of:
   a) preparing a mixture of water with a starch containing product having a soluble starch content constituting 30% of its original weight;
   b) heating the mixture at a temperature of from about 50° to about 65° C. for from about 5 to about 10 minutes;
   c) separating said starch product remaining in the heated mixture from step b) by filtration;
   d) mixing said starch product, collected following the filtration of step c), with water and bringing the water starch mixture to a temperature of about 50° to 65° C., maintaining the mixture at this temperature for about 5-8 minutes, and separating the water from the starch product remaining by filtration;
   e) repeating step d) at least 3-4 times;
   f) collecting the starch product remaining after the final filtration of step e) from which the water soluble starch has been removed by about 5-10% at each repeating step e); and
   g) drying the collected starch product from step f), wherein the starch product retains its shape and appearance as well as its taste.

2. The method of claim 1 wherein the starch product collected after step c) has a glycemic index reduction of about 20 to about 40 percent.

3. The method of claim 1 wherein the starch product collected after step f) has a glycemic index reduction of about 20 to 50%.

4. The method of claim 1 wherein the starch used in step a) is obtained from a plant source.

5. The method of claim 4, wherein said plant source is at least one member selected from the group consisting of cereals, legumes, tubers, roots and fruit.

6. The method of claim 4 wherein said starch used in step a) is obtained from a member selected from the group consisting of corn, rice, barley, wheat, oat, pea, sago, tapioca, arrowroot, sweet potato, yam and bananas.

7. The method of claim 6 wherein said starch used in step a) is rice.

8. The method of claim 1 wherein the starch product from step f) is used as an ingredient of a food or beverage product.

9. The method of claim 8 wherein said starch is used as an ingredient of a dry food product.

10. The method of claim 1 wherein the starch product from step f) is used in a nutritional supplement or drug product.

11. The method of claim 1 wherein the starch product from step f) is used in an edible food product in an amount of between about 0.01% by weight to about 100% by weight.

12. The method of claim 1 wherein the starch product from step f) is used in an edible food product in an amount of between about 1.0% by weight to about 50% by weight.

13. The method of claim 8 wherein the starch product from step f) is used as an ingredient in a member selected from the group consisting of baked goods, pasta, snack bars, cereals, confections, dressings, fillings, icings, sauces, syrups, gravies, puddings, custards, processed dairy compositions, soups, beverages, sports drinks and sustained energy release foods.

14. The method of claim 1 wherein the starch product from step f) can be used as a functional food grade additive which provides beneficial rheological properties.

15. The method of claim 1 wherein the water containing soluble starch remaining after each of the filtration steps c-e and separately collected are combined and used directly or after addition of at least one of a thickening agent, pharmaceutical, cosmetic, moisturizer, colorant, enzyme and preservative as a drug, supplement, cosmetic or blood extender.

16. A starch having a low glycemic index made by the method of claim 1.

17. A food product having a low glycemic index containing about 0.01% by weight to about 100% by weight of a starch according to claim 16.

18. A food product having a low glycemic index according to claim 16 wherein the source of the starch is member selected from the group consisting of cereals, legumes, tubers, roots and fruit.

19. A food product having a low glycemic index according to claim 16, wherein the source of the starch is a member selected from the group consisting of corn, rice, barley, wheat, oat, pea, sago, tapioca, arrowroot, sweet potato, yam and bananas.

20. A starch according to claim 16 having a glycemic index reduction of 55% or less.

* * * * *

UNITED STATES PATENT AND TRADEMARK OFFICE
CERTIFICATE OF CORRECTION

PATENT NO.         : 8,568,820 B2                                        Page 1 of 1
APPLICATION NO.    : 13/330841
DATED              : October 29, 2013
INVENTOR(S)        : Bashir A. Zikria It is certified that error appears in the above-identified patent and that said Letters Patent is hereby corrected as shown below:

On the Title Page

Item 12, delete "Zirkia" and insert: -- Zikria --

Item 76, delete "Zirkia" and insert: -- Zikria --

Signed and Sealed this
Twenty-second Day of July, 2014

Michelle K. Lee
*Deputy Director of the United States Patent and Trademark Office*